United States Patent
Huffman et al.

(10) Patent No.: US 12,435,260 B2
(45) Date of Patent: Oct. 7, 2025

(54) SYNERGISTIC EFFECTS OF ASPHALTITE AND GRAPHENE ON CEMENT RESILIENCE

(71) Applicant: Halliburton Energy Services, Inc., Houston, TX (US)

(72) Inventors: Chad Bryant Huffman, Houston, TX (US); Thomas Jason Pisklak, Houston, TX (US); Giorgio DeVera, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 18/526,672

(22) Filed: Dec. 1, 2023

(65) Prior Publication Data

US 2025/0179344 A1   Jun. 5, 2025

(51) Int. Cl.
| | |
|---|---|
| *C09K 8/467* | (2006.01) |
| *C04B 14/02* | (2006.01) |
| *C04B 24/36* | (2006.01) |
| *C04B 40/00* | (2006.01) |
| C04B 103/00 | (2006.01) |

(52) U.S. Cl.
CPC ............ *C09K 8/467* (2013.01); *C04B 14/024* (2013.01); *C04B 24/36* (2013.01); *C04B 40/0032* (2013.01); *C04B 2103/0092* (2013.01)

(58) Field of Classification Search
None
See application file for complete search history.

(56) References Cited

U.S. PATENT DOCUMENTS

| | | | |
|---|---|---|---|
| 10,150,904 B1 * | 12/2018 | Rahman | C04B 14/047 |
| 11,739,247 B1 | 8/2023 | Boul | |
| 2015/0152314 A1 | 6/2015 | Muthusamy et al. | |

(Continued)

FOREIGN PATENT DOCUMENTS

| | | | | |
|---|---|---|---|---|
| CA | 3111985 A1 | | 3/2020 | |
| WO | WO 2021076667 | * | 4/2021 | C04B 7/02 |
| WO | 2023168263 A1 | | 9/2023 | |

OTHER PUBLICATIONS

Filing Receipt, Specification and Drawings for U.S. Appl. No. 18/367,145, filed Sep. 12, 2023, entitled "Bioderived Renewable Graphene Enhanced Cement," 46 pages.

(Continued)

*Primary Examiner* — Anuradha Ahuja
(74) *Attorney, Agent, or Firm* — Conley Rose, P.C.; Rodney B. Carroll

(57) ABSTRACT

A hardened cement produced by setting a cement slurry including an asphaltite (e.g., GILSONITE™ uintaite), graphene (e.g., bioderived renewable graphene (BRG), non-BRG graphene, a synthetic graphene, or a combination thereof), a cement, and water. The cement slurry can comprise from about 0.2 to about 20 weight percent of the asphaltite and from about 0.2 to about 20 weight percent of the graphene by weight of cement (% graphene bwoc). The hardened cement has one or more enhanced mechanical properties (e.g., increased compressive strength (CS), or increased resiliency as indicated by an increased reduction in a ratio of YM/CS) relative to a same hardened cement produced by allowing to set a same cement slurry absent the asphaltite and/or the graphene. Methods of cementing with the cement slurry are also provided.

7 Claims, 3 Drawing Sheets

(56) References Cited

U.S. PATENT DOCUMENTS

| | | | |
|---|---|---|---|
| 2018/0282214 A1* | 10/2018 | Xiang | C04B 28/006 |
| 2019/0144280 A1 | 5/2019 | Opoku | |
| 2020/0308469 A1* | 10/2020 | Taleghani | C04B 28/02 |
| 2021/0061661 A1 | 3/2021 | Opoku | |
| 2021/0238040 A1 | 8/2021 | Opoku et al. | |
| 2023/0279283 A1 | 9/2023 | Pang et al. | |
| 2024/0059608 A1* | 2/2024 | Lewis | C04B 40/0046 |
| 2024/0059952 A1* | 2/2024 | Pisklak | C04B 40/0039 |
| 2024/0059953 A1* | 2/2024 | Pisklak | C09K 8/467 |
| 2024/0059955 A1* | 2/2024 | Pisklak | C04B 14/024 |
| 2024/0247178 A1* | 7/2024 | Pisklak | C04B 40/0039 |

OTHER PUBLICATIONS

Filing Receipt, Specification and Drawings for U.S. Appl. No. 17/892,775, filed Aug. 22, 2022, entitled "Graphene Fluid Utilized to Suspend Particulates," 46 pages.

Filing Receipt, Specification and Drawings for U.S. Appl. No. 17/892,781, filed Aug. 22, 2022, entitled "Use of Graphene as a Cement Retarder," 43 pages.

Filing Receipt, Specification and Drawings for U.S. Appl. No. 17/892,787, filed Aug. 22, 2022, entitled "Mitigation of Transient Gels in Cements," 41 pages.

Filing Receipt, Specification and Drawings for U.S. Appl. No. 17/892,790, filed Aug. 22, 2022, entitled "Use of Graphene to Enhance Stability and Density Control of Cement Slurriess," 40 pages.

* cited by examiner

SYNERGISTIC EFFECTS OF ASPHALTITE AND GRAPHENE ON CEMENT RESILIENCE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally cements. More specifically, the present disclosure relates to cements having enhanced resilience. Still more specifically, the present disclosure relates to cements comprising asphaltite (e.g., GILSONITE™ uintaite) and graphene (e.g., bioderived renewable graphene (BRG)) that, when set, provide enhanced mechanical properties relative to set cements absent the asphaltite, thus making them useful as oilwell cements.

BACKGROUND

Effective zonal isolation of wellbores requires cement sheaths which are highly resilient and capable of withstanding repeated stresses. However, typical Portland cements can have high compressive strengths (CSs) and concomitantly high Young's moduli (YM). These cements can be strong, but brittle, with insufficient resiliency over the life of the well. It may thus be desirable to have a cement with a relatively high compressive strength and a relatively low Young's modulus.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
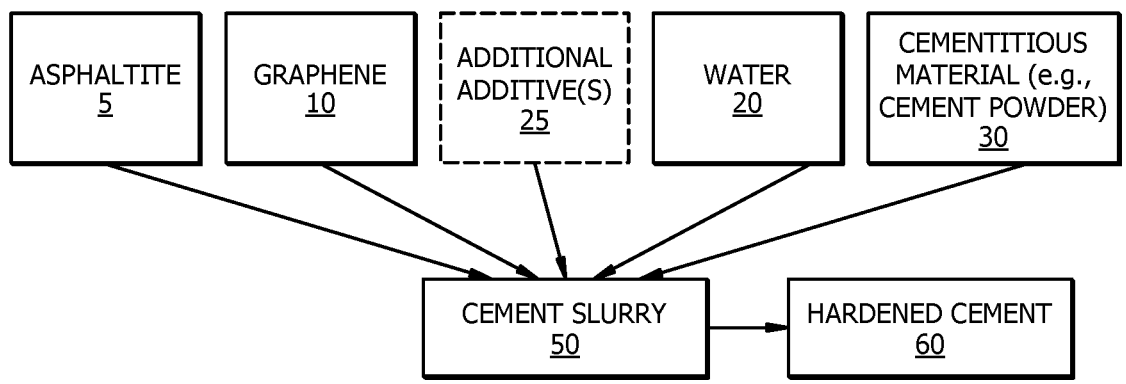
FIG. 1 is a schematic of a cement slurry, according to embodiments of this disclosure.

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

As utilized herein, the phrase "percent by weight of water", abbreviated "% bwow", indicates the amount of additive material divided by the weight of water multiplied by 100 and the phrase, "percent by weight of the composition" or "percent by weight of cement", abbreviated "% bwoc", indicates the amount of additive material divided by the weight of cementitious material multiplied by 100.

As noted above, effective zonal isolation of wellbores requires the use of a isolation sheaths that are resilient and effectively bond (adhere) to the casing and wellbore. An adherent sheath is able to prevent the creation of a micro annulus and promote effective zonal isolation, by adhering to both the steel casing and the surrounding formation. A resilient sheath can resist the initiation and propagation of microcracks, which can otherwise occur during cyclic stresses that occur during operations and that lead to reduced sheath integrity. Although wellbore additives are conventionally utilized to increase the resilience of Portland cements, compressive strength is often reduced due to the inert nature of Portland cements and dilution of the cement.

The mechanical properties of conventional Portland cements include relatively high compressive strength and high Young's modulus. High compressive strength is generally desirable, but a high Young's modulus, on the other hand, reveals a brittleness in the material that can be detrimental to the operation of the sheath. A more resilient cement, such as disclosed herein, exhibits both a high compressive strength and a low Young's modulus. As discussed herein, the "resilience" of a cement can be estimated by dividing the Young's modulus by the compressive strength, with a lower number generally indicating increased resilience.

As noted above, resilient cements can be characterized by a relatively high compressive strength (CS) and low Young's modulus (YM). Conventionally, the lack of resiliency provided by typical Portland cements has been addressed via the use of additives. However, along with the desired changes in cement resiliency (e.g., reduced YM), such additives can also result in undesired concomitant reductions in CS. Furthermore, large amounts of these conventional additives (e.g., 1-50, often 10-20 or more % bwoc) can typically be utilized to effect such changes.

It has been unexpectedly discovered that a combination of an asphaltite (e.g., uintaite, also known as "uintahite", such as GILSONITE™ uintaite, also referred to herein simply as "GILSONITE") and graphene can synergistically enhance the mechanical properties of a cement beyond what would be expected from simply adding their individual performances. Without being limited by theory, a synergistic effect may result from interaction of asphaltite (e.g., GILSONITE™ uintaite) and graphene through pi-pi interactions between the components (e.g., aromatics) of asphaltite (e.g., GILSONITE™ uintaite) and the graphene; such synergistic interaction can improve the resilience of a resulting set cement. As utilized herein, "asphaltite" includes naturally occurring asphalt type materials as described in more detail herein.

Via this disclosure, asphaltite and graphene can be utilized to provide a hardened cement (also referred to as a "set" cement) having enhanced mechanical properties relative to hardened cement produced from a cement slurry absent the asphaltite, the graphene, or both (the latter referred to herein as a "same cement slurry"). In embodiments described herein, amounts of asphaltite and graphene can be combined with water and a cement (e.g., a cement powder, also referred to herein as a cementitious material) in a cement slurry, positioned in a workspace, and allowed to harden in the workspace (e.g., wellbore) to provide the set cement of this disclosure having the enhanced mechanical properties. For brevity, reference to "enhanced mechanical properties" refers to enhanced mechanical properties relative to the same set cement produced from a cement slurry absent the asphaltite and/or graphene. As detailed further hereinbelow, the enhanced mechanical properties can include an increased compressive strength (CS), an increased or decreased Young's modulus, an increased Poisson's ratio (PR), a reduced ratio of the YM to the CS (referred to as the YM/CS ratio or indication of "resilience"), or a combination thereof. The YM can increase or decrease, so long as the YM/CS ratio is decreased (e.g., the YM can increase less than the CS increases, in embodiments, such that the YM/CS ratio still decreases). The CS can be the CS as measured via ASTM C39/C39M, the YM can be the YM as measured via ASTM C469/C469M. The PR can be measured via ASTM C469/C469M. The ASTM measurements can be at surface conditions.

The system and method of this disclosure provide for the use of asphaltite and graphene for enhancing one or more properties of a set cement produced by hardening a cement slurry comprising the asphaltite and graphene. Since asphaltite and graphene are highly temperature resistant, they can be utilized, in embodiments as described herein, for cementing at the high temperatures encountered in oilwell cementing operations.

As noted above, herein disclosed are cement slurries and methods of making and using same that provide for set cements having enhanced mechanical properties relative to set cements produced from otherwise the same cement slurries absent the asphaltite, the graphene, or both. The cement slurry of this disclosure, and methods of making and using same, will now be described with reference to FIG. 1, which is a schematic of a cement slurry 50 (also referred to herein as a "cement composition" 50), according to embodiments of this disclosure; FIG. 2A and FIG. 2B, which are schematic flow diagrams of a method 200A and 200B, respectively, of making such a cement slurry 50, according to embodiments of this disclosure; and FIG. 3, which is a schematic flow diagram of a method of utilizing the cement slurry 50, according to embodiments of this disclosure. Reference to "cement slurry" can indicate an unset cement slurry that has not yet hardened to a hardened or "set" cement 60, such as a recently mixed cement slurry. A set or hardened cement is obtained via allowing a cement slurry 50 to set for a time sufficient such that the cement slurry changes from a fluid to a solid state, for example, as defined by the set cement reaching 50 psi compressive strength.

Figure 2A:
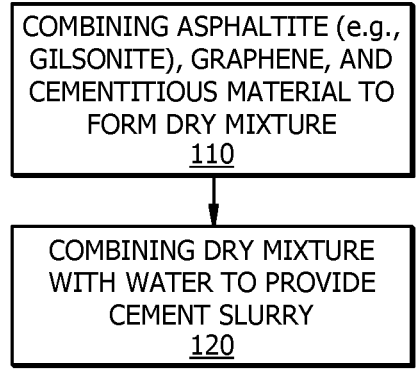
FIG. 2A is a schematic flow diagram of a method of making a cement slurry, according to embodiments of this disclosure.
Figure 2B:
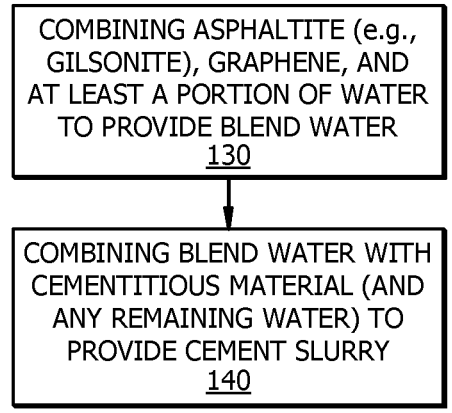
FIG. 2B is another schematic flow diagram of a method of making a cement slurry, according to embodiments of this disclosure.

With reference to FIG. 1, a cement slurry 50 of this disclosure comprises an asphaltite 5, graphene 10, water 20 (also referred to herein as "aqueous base fluid" 20), and a cementitious material 30 (e.g., a cement powder, also referred to herein simply as a "cement"). The cement slurry 50 sets to provide a hardened or set cement 60 having enhanced mechanical properties relative to a set cement produced from an otherwise same cement slurry 50 absent the asphaltite 5, the graphene 10, or both.

Cement slurry 50 comprises asphaltite 5. Asphaltite (sometimes referred to as uintaite, asphaltum, GILSONITE™ or oil sands) is a naturally occurring soluble solid hydrocarbon, a form of asphalt or bitumen with a relatively high melting temperature. Asphaltite is a mixture of high molecular weight organic substances, mainly polyaromatic compounds typically characterized by a black color. Bitumen/asphalt is a general term for a group of combinatory material from heavy hydrocarbons which are flammable and are solved in aromatic and aliphatic solvent. Bitumen is a naturally occurring or refined semi-solid form of petroleum, recognized for its black or dark brown appearance. It primarily consists of hydrocarbons and exhibits adhesive and waterproofing properties. Two primary sources of bitumen include natural occurrences and byproducts of crude oil refining processes. Bitumen exhibits stickiness, viscosity, and water resistance, making it a foundational material in various industries. A naturally occurring form of asphaltite that is sourced from the Uinta Mountains or the Uintah Basin can be referred to as uintaite. As utilized herein, "asphaltite" material includes bitumen, asphalt and GILSONITE™.

GILSONITE™ like other uintaites, is a naturally occurring form of solid, asphalt (bitumen), which is soluble in aromatics. GILSONITE™ is the trade name of a specific uintaite that can be found in significant deposits, notably in the Uintah Basin of Utah, USA. GILSONITE™ mined in Utah can be provided by American GILSONITE™ Company, 29950 Bonanza Hwy, Bonanza, UT 84008. An enhanced product that is produced by American GILSONITE™ Company is known as GILSONITE™ G-Bond, which is the GILSONITE™ product with a surfactant coating. GILSONITE™ is a specific type of uintaite which is a naturally occurring form of asphalt. GILSONITE™ is a natural hydrocarbon which is a shiny material and is highly brittle when having high purity. GILSONITE™ can comprise primarily asphaltenes (e.g., greater than or equal to about 79, 79.5, 80 weight percent (wt %) asphaltenes) and aromatics (e.g., less than or equal to about 30, 29, 28 wt % aromatics). Asphaltene is the heaviest, nonvolatile fraction/components of the crude oil and includes molecules having a complex structure containing carbon, oxygen, nitrogen, and sulfur.

While GILSONITE™ shares some similarities with bitumen, its primary distinguishing feature is its hard, brittle consistency. GILSONITE™ or another uintaite, asphaltite, asphalt or bitumen, or high asphaltene material can be utilized herein as a cement additive to improve casing and formation adhesion and to improve resiliency (e.g., Young's modulus to compressive strength ratio) of cement. In embodiments, the asphaltite 5 can comprise GILSONITE™, such as GILSONITE™ G-Bond and/or another uintaite, and/or another uintaite, asphaltite, asphalt or bitumen, or asphaltene source. As utilized herein, the term asphaltite thus includes GILSONITE™ other types of uintaite or asphaltites, or other naturally or synthetic asphalts/bitumen comprising asphaltenes.

Asphaltite 5, constituting a fraction of crude oil, can include high-molecular-weight hydrocarbons that are insoluble in certain lighter solvents (e.g., n-heptane) but soluble in aromatic solvents. Asphaltites can be characterized by fused aromatic ring systems and may contain heteroatoms such as nitrogen, oxygen, and/or sulfur. Asphaltite 5 can comprise consist primarily of carbon (C), hydrogen (H), nitrogen (N), oxygen (O), and sulfur(S), as well as trace amounts of vanadium (V) and nickel (Ni). The C:H ratio can be approximately 1:1.2, depending on the asphaltite source. Asphaltite 5 can be defined operationally as the n-heptane ($C_7H_{16}$)-insoluble, toluene ($C_6H_5CH_3$)-soluble component of a carbonaceous material, such as crude oil, bitumen, or coal. Asphaltites 5 can have a distribution of molecular mass in the range of 400 IU to 1500 IU, for example, but the average and maximum values can be difficult to determine due to aggregation of the molecules in solution.

The cement slurry 50 can comprise from about 0.2 to about 20, from about 0.2 to about 15, from about 0.1 to about 10, or from about 0.1 to about 5 percent asphaltite 5 by weight of cement (% graphene bwoc). In embodiments, the cement slurry 50 can comprise from about 0.2 to about 20, from about 0.2 to about 15, from about 0.2 to about 10, or from about 0.1 to about 5 percent uintaite (e.g., GILSONITE™ uintaite) as asphaltite 5 by weight of cement (% graphene bwoc).

Typical graphene (referred to hereafter in this document as 'synthetic graphene (SG) or standard graphene (SG)') are produced from non-bioderived or non-renewable materials such as pyrolytic graphite. However, it has recently been discovered that graphene can also be made from green, renewable sources, such as, among many others, cassava root. As noted hereinabove, BRG of this disclosure can comprise graphene produced (and/or derived) from any type of biomass, biomass waste, or other green, renewable, and sustainable feedstocks. BRG alone or in combination with standard graphene SG can be utilized herein as graphene 10, in combination with asphaltite 5 (e.g., GILSONITE™) as a mechanical property modifier for oilwell cements. It has been unexpectedly discovered that asphaltite 5 in combination with graphene 10 is more effective than graphene 10 or asphaltite 5 alone for producing cement slurries having improved resilience (e.g., relative to same cement slurries absent the asphaltite 5, the graphene 10, or both the asphaltite 5 and the graphene 10).

The cement slurry 50 can comprise from about 0.2 to about 20, from about 0.2 to about 15, from about 0.1 to about 10, or from about 0.1 to about 5 percent graphene 10 by weight of cement (% graphene bwoc). In embodiments, the cement slurry 50 can comprise from about 0.2 to about 20, from about 0.2 to about 15, from about 0.1 to about 10, or from about 0.1 to about 5 percent graphene 10 by weight of cement (% graphene bwoc). In embodiments, the cement slurry 50 can comprise from about 0.2 to about 20, from about 0.2 to about 15, from about 0.2 to about 10, or from about 0.1 to about 5 percent graphene 10 by weight of cement (% graphene bwoc).

Graphene 10 is a nanomaterial that has exceptional strength in two dimensions. Graphene 10 can be incorporated into cement slurry 50 to increase compressive strength and to reduce cracking and crack propagation, interacting with asphaltite 5 to increase the YM/CS ratio of the set cement 60.

As noted hereinabove, graphene 10 can comprise bioderived renewable graphene (BRG), standard (non-bioderived) graphene SG, or a combination thereof. In embodiments, graphene 10 can comprise, consist essentially of, or consist of BRG, in embodiments. In embodiments, graphene 10 can comprise, consist essentially of, or consist of non-BRG, in embodiments. Thus, in embodiments, the graphene 10 does not comprise or does not consist of any synthetic or traditional graphene SG, while, in other embodiments, the graphene 10 does not comprise or does not consist of any BRG. In embodiments, the graphene 10 comprises, consists essentially of or consists of BRG. In embodiments, graphene 10 can comprise BRG and non-BRG (e.g., standard graphene, such as pyrolytic graphene). The cement slurry 50 can comprise from about 0.2 to about 20, from about 0.2 to about 15, from about 0.5 to about 5, or greater than or equal to about 0.2, 0.3, 0.4, 0.5, 1, 2, 3, 4, 5, 6, 7, 8, 9, 10, 11, 12, 13, 14, or 15, and/or and less than or equal to about 20, 19, 18, 17, 16, 15, 14, 13, 12, 11, 10, 9, 8, 7, 6, 5, 4, 3, 2, 1, 0.5, 0.4, 0.3, or 0.25 percent graphene (e.g., BRG and/or SG) by weight of cement 20 (% graphene bwoc). The graphene 10 can comprise 10, 20, 30, 40, 50, 60, 70, 80, 90, or 100 wt % BRG, with any remainder of the graphene 10 being non-BRG graphene SG. In embodiments, the graphene 10 can consist or consist essentially of BRG (e.g., graphene 10 can consist essentially of or consist of BRG). For example, in embodiments, the cement slurry 50 can comprise from about 0.2 to about 20, from about 0.2 to about 15, from about 0.5 to about 5, or greater than or equal to about 0.2, 0.3, 0.4, 0.5, 1, 2, 3, 4, 5, 6, 7, 8, 9, 10, 11, 12, 13, 14, or 15, and/or and less than or equal to about 20, 19, 18, 17, 16, 15, 14, 13, 12, 11, 10, 9, 8, 7, 6, 5, 4, 3, 2, 1, 0.5, 0.4, 0.3, or 0.25 percent BRG by weight of cement 20 (% graphene bwoc).

As noted above, the graphene 10 can comprise bioderived renewable graphene (BRG), in embodiments. The BRG comprises graphene 10 derived from a plant. In embodiments, the BRG comprises graphene 10 derived from a carbohydrate. For example, in embodiments, the carbohydrate comprises cassava (e.g., cassava root), corn (e.g., corn grain, corn flour), sugar cane (e.g., sucrose), sugar beets, wheat, yam, potatoes, and/or rice (e.g., rice grain), biomass waste (e.g., manure), crop waste, food processing waste, paper waste, agricultural waste, or a combination thereof. In embodiments, the graphene 10 comprises BRG derived from cassava, corn, and/or rice. The BRG can comprise graphene with a fused sheet-like morphology (e.g., graphene nanosheets, referred to herein as "nanosheets"). Sheet-like indicates stratified, deposited, or arranged in horizontal layers. For example, such BRG derived from cassava and comprising graphene nanosheets is described in U.S. Patent Publication No. 2021/0061661, U.S. Patent Publication No. 2021/0238040, and U.S. Patent Publication No. 2019/0144280, the disclosure of each of which is hereby incorporated herein in its entirety for purposes not contrary to this disclosure. In embodiments, the graphene 10 comprises, consists essentially of or consists of BRG such as described in the aforementioned patent applications and/or obtained from SurgePower Materials, Inc., New Braunfels, TX.

In embodiments, the BRG comprises a carbon nanosheet with distinct properties that can be produced from a renewable carbonaceous raw materials such as, without limitation, cassava root extract, corn flour, rice grain, wheat flour, yam root extract, potatoes root extract, sugar beet roots extract and sucrose (generally referred to herein as carbohydrates). The process for making carbon nanosheet from these carbohydrates can be as follows.

First, the aforementioned carbohydrate can be placed in a solvent, such as a solvent containing water or ethylene glycol or ethanol, to aid hydrolysis. This can be followed by gradual removing of glycosidic linkages in the carbohydrate via chemical and/or thermal activation. This pre-treatment step causes formation of intermediate fused carbon material, which contains limited amount of glycosidic bonds, hydroxyl and carbonyl groups. Chemicals that can be effective include, without limitation, sodium hydroxide, hydrochloric acid, phosphoric acid, phosphorous acid, and nitric acid. In addition, catalyst such as yeast, aluminum-nickel alloy, cobalt, $B_2H_6$, zinc, and copper can be employed.

The mixture of carbonaceous material and chemical and/or catalyst can be exposed to approximately 45 to 1050° C., in air or inert atmosphere to aid formation of a fused carbon network with a sheet-like morphology, referred to herein as an intermediate carbon material.

Another step can include thermochemical activation of the intermediate carbon based material to initiate chemical bonding of carbon atoms to form a hexagonal planar network of mainly sp2 hybridization carbons. This occurs by at least switching oxygen atom and releasing hydroxyl portion of said intermediate carbon material to result in a short range or long range of aromatic ring structure or a mixture of both within the sheet that is retained and other groups or molecules are released. This step can be performed at temperature in the range of 500 to 1500° C., in an inert gas containing hydrogen gas, in embodiments, and can result in a network of high surface area and pore volume sp2 bonded carbon nanosheet.

The resulting carbon nanosheet powders can be washed with up to 10 volume percent hydrochloric acid (HCl) to remove any remaining precursors and catalyst in the final product, and can be followed by heat treatment at 700 to 1500° C., for example in inert atmosphere.

Alternatively or additionally, the step of treating the intermediate carbon product to form mainly sp2 hybridization carbons can be accomplished via chemical process. Such process can include, without limitation, treating the intermediate carbon product with a chemical, such as a chemical chosen from the group of hydrazine, $LiAlH_4$, $B_2H_6$, and/or $NaBH_4$; in embodiments, hydrazine, and in other embodiments $NaBH_4$.

As mentioned above, the process of producing carbon nanosheets can begin with a renewable carbonaceous raw material, such as cassava root extract, corn flour, rice grain, wheat flour, or sucrose. These renewable carbonaceous materials contain a high content of carbohydrates on a water free basis, typically more than 70% by weight. The renewable carbonaceous material can contain various percentages of glucose, and fructose bonded together by glycosidic linkages to form polymeric units such as amylase and amylopectin. Although the molecular formula for glucose and fructose are the same, thus ($C_6H_{23}O_6$), they have different molecular structures.

In order to obtain a carbon nanosheet, each carbohydrate unit can be pre-treated with a dehydration solution, for example containing at least 1% of acid or catalyst. The pretreatment can result in an intermediate carbon material with dark-grey color made up of fused sheet-like morphology.

The mechanism can unfold in two stages. First, the treatment of the carbohydrate via chemical and/or thermal activation can result in hydrolysis and removal of the glycosidic linkages in the polymeric carbohydrate unit to form individual glucose and fructose units. This can be followed by a second mechanism to remove water molecules from each of glucose or fructose units by a dehydration solution. The pretreatment can be accomplished by gradual heating of the carbohydrate and hydration solution, for example at 45 to 1050° C., preferably 80° C., e.g., for up to 36 hours or more. In the process, the carbon atoms can rearrange to form a ring with neighboring carbon atoms. The hydration solution can cause intercalation of the layers of carbon after ring formation, thus giving rise to a layered structure.

The intermediate carbon product can undergo a second treatment to exfoliate the intercalated carbon layers. Several thermal and/or chemical methods can be used to exfoliate the carbon sheet. Thermal methods include direct heating of the intermediate carbon material. Radiant heating in a resistive furnace, or on top of a hotplate, laser irradiation and microwave irradiation can be effective for exfoliating carbon nanosheet and removal of water molecules to form mainly sp2 bonded carbon nanosheets.

Thermal exfoliation via microwave heating can remove substantial amount of $H_2O$ molecules from the intermediate carbon materials, with a reduction in oxygen content from the intermediate carbon materials, for example from 39.5 to 14.6 weight percent.

Exfoliated carbon nanosheets can be washed (e.g., with a 10 volume percent HCl) to remove remaining hydration solution and/or catalyst compounds. Subsequently, the resulting product can be washed with de-ionized water one or several times, for example until the pH is about 7. The resulting material can be thermally treated at high temperature in inert atmosphere to remove any groups attached to the nanosheet and terminate the ends with hydrogen. The carbon nanosheets can have a sheet-like morphology, and carbon composition can be up to 90, 91, 92, 93, or 94 weight percent or more.

In an alternate method of producing BRG comprising carbon nanosheets, the carbohydrate can be soaked in dehydration solution, as previously discussed. The mixture can be directly exposed to rapid and uniform high temperature heating immediately after thorough and uniform mixing. This can cause removal of glycosidic bonds and release of water molecules, thereby forcing the resulting intermediate carbon materials to exfoliate into carbon nanosheet. Specifically, heating can be accomplished by microwave irradiation and/or heating in an oven preheated, for example, to at least 500° C., to yield the carbon nanosheet.

In other embodiments, after thorough and uniform mixing of said carbohydrate and dehydration solution (e.g., containing excess deionized water), this mixture can be slowly heated to temperature below 100° C., and held there a time of, for example, less than 24 hours. The mixture can form a dark colored intermediate solution containing carbon. The dark intermediate solution can be coated on a substrate to form thin films. The resulting films can be exposed to high temperatures in inert atmosphere containing, for example, at least 2% by volume hydrogen gas. The films can be slowly heated, for example in the range of 700-1500° C., to form a thin layer of conducting carbon nanosheet on a substrate. The substrate can include, for example, copper foil, silicon wafer, glass slide or a quartz substrate.

In embodiments, a process for forming the nanosheets can comprise providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, e.g., where the dehydration solution has a hydrogen ions concentration of at least approximately 1%; charging said reactor with air or inert gas; heating the reaction mixture to remove glycosidic linkages and water molecules from the carbohydrate, thereby producing an intermediate mixture with sheet-like morphology; and further heating the intermediate mixture in inert gas to form the carbon nanosheet material. The carbon nanosheet material can be in the form of a powder. The carbohydrate source can comprise yam root extract, potato root extract, cassava root extract, cassava root flour, tapioca flour, dried cassava root pulp, dried and fried cassava root flakes, sugarcane extract, sugar beet root extract, sucrose, rice grain, corn, or wheat grain.

In embodiments, the solvent can be chosen from distilled water, deionized water, ethanol, and ethylene glycol. In embodiments, the dehydration solution can be chosen from sodium hydroxide, hydrochloric acid, phosphoric acid, phosphorous acid, and nitric acid. In embodiments, the process further comprises removing the dehydration solution by washing and diluting with excess distilled or deionized water prior to further heating of the intermediate mixture.

The catalyst can be chosen from platinum, palladium, LiAlH$_4$, nickel, yeast, aluminum-nickel alloy, cobalt, B$_2$H$_6$, zinc, NaBH$_4$, copper, or combinations thereof. The process can further include removing the catalyst by washing, filtering, magnetic separation, sonication, sieving, and/or centrifugation prior to further heating of the intermediate mixture.

The heating of the reaction mixture can be carried out in air or inert gas, for example at approximately 45 to 1050° C. The process can further include, prior to further heating the intermediate mixture, drying the intermediate mixture to produce an intermediate mixture in form of a powder; wherein the intermediate mixture in form of powder is heated in the inert gas, for example at approximately 500 to 1500° C., to produce the carbon nanosheet material. The inert gas can comprise, for example, argon, helium, or nitrogen, and can optionally further comprise a partial pressure of hydrogen gas. The intermediate mixture can be heated to a temperature of approximately 45 to 1050° C.

The carbon nanosheet material can have a specific surface area of at least 2000, 2100, 2200, 2300, 2400, or 2496 m$^2$/g and/or a pore volume of at least 3.0, 3.1, 3.2, 3.3, 3.4, 3.5, or 3.6 cc/g. The carbon nanosheet material can have a pore volume of up to 3.0, 4.0, or 5.0 cc/g.

In embodiments, graphene 10 can comprise a graphene material produced as described, for example, in CA3111985 A1 entitled, "Flash Joule Heating Synthesis Method and Compositions Thereof", the disclosure of which is hereby incorporated herein for purposes not contrary to this disclosure.

Cementitious material 30 (also referred to herein simply as "cement powder" or "cement" 30) can comprise a cement powder, such as, without limitation, a Portland cement. A variety of cementitious materials 30 can be used in the cement slurry 50, including cementitious materials comprised of calcium, aluminum, silicon, oxygen, and/or sulfur which set and harden by reaction with water. Suitable hydraulic or pozzolanic cements include Portland cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations.

In embodiments, the cementitious material 30 comprises an ASTM (American Society for Testing and Materials) grade cement (e.g., Type I, Type II, etc.). In embodiments, the cementitious material 30 comprises a non-ASTM grade cement (e.g., is not an ASTM grade cement). In embodiments, the cementitious material 30 comprises an API cement (e.g., Class, A, Class C, Class H, etc.). In embodiments, the cementitious material 30 comprises a non-API cement (e.g., is not an API cement).

In embodiments, cementitious material 30 comprises an ASTM Type I, IA, II, IIA, III, IIIA, IV, V, VI, or VII Portland cement, or a combination or subtype thereof, such as, for example, a Type IL (e.g., limestone) cement powder, as defined in the ASTM standard (e.g., ASTM C150). In embodiments, cementitious material 30 comprises an API Portland cement from Class A, B, C, D, E, F, G, H, K, and/or L, such as from one of more of Classes A, C, H, and G.

In embodiments, cement 50 can comprise a construction grade cementitious material 30. According to this disclosure, a construction grade cement is a non-API cement, such as a cementitious material 30 comprising greater than about 1% by weight of tricalcium aluminate, C3A. In embodiments, the cementitious material 30 has an aluminate content (e.g., C3A) in a range of from about 1 to about 30, from about 3 to about 20, from about 5 to about 15, or greater than or equal to about 1, 3, or 5 percent aluminate by mass of cementitious material 30.

The cement slurry 50 of this disclosure can contain one or more additional additives 25. In embodiments, the additives 25 can comprise, without limitation, one or more selected from resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, cement kiln dust, gas migration control additives, formation conditioning agents, or combinations thereof.

Water 20 can comprise an aqueous base fluid. An aqueous base fluid 20 can be present in the cement slurry 50 in an amount sufficient to make a slurry which is pumpable for introduction to a desired location in a workspace, for example, down hole, in embodiments. In embodiments, the aqueous base fluid or water 30 comprises fresh water; brackish water; saltwater; or a combination thereof. The water 20 can be fresh water, brackish water, saltwater, or any combination thereof. In embodiments, the water 20 can be present in the cement slurry 50 in an amount of from about 20% to about 80% by weight of cement ("bwoc"), from about 28% to about 60% bwoc, or from about 36% to about 66% bwoc.

In embodiments, the cement slurry 50 can have a slurry density which is pumpable for introduction down hole. In embodiments, the density of the cement slurry 50 is from about 7 pounds per gallon (ppg) to about 20 ppg, from about 10 ppg to about 18 ppg, or from about 13 ppg to about 17 ppg.

A yield point of the cement slurry 50 as measured according to API 10B-2 (e.g., after two hours of quiescent aging at room temperature and pressure) can be reduced by at least 10, 20, 30, 40, or 50% relative to a same cement slurry absent the asphaltite 5 and/or graphene 10. An apparent viscosity at 100 RPM (AVIS$_{100}$) of the cement slurry 50 as measured, for example, according to API 10B-2 (e.g., after two hours of quiescent aging at room temperature and pressure) can be reduced by at least 10, 20, 30, 40, or 50% relative to the same cement slurry absent the asphaltite 5 and/or graphene 10. A thixotropic rate of the cement slurry 50, measured as the ten minute yield point (e.g., measured according to API 10B-2) divided by ten can be less than a thixotropic rate of a same cement slurry absent the asphaltite 5 and/or graphene 10. In embodiments, the thixotropic rate of the cement slurry 50 can be reduced by at least 5, 10, 15, or 20% relative to the thixotropic rate of the same cement slurry absent the asphaltite 5 and/or graphene 10.

Also provided herein is a method of making a cement slurry 50. The components of the cement slurry (e.g., asphaltite 5, graphene 10, water 20, cementitious material 30, and any additional additives 25) can be combined in any order. Example methods will now be described with reference to FIG. 2A and FIG. 2B, which are schematic flow diagrams of methods 100A and 100B, respectively, according to embodiments of this disclosure. However, different orders of combination of the components of cement slurry 50 are envisioned and within the scope of this disclosure. Method 100A of FIG. 2A of making the cement slurry 50 comprises, combining asphaltite 5, graphene 10, and cementitious material 30 as a dry mixture at 110, and combining the dry mixture obtained at 110 with water 20 to provide the cement slurry 50 at 120.

In alternative or additional embodiments, graphene 10 and cementitious material 30 can be combined with water 20, prior to adding asphaltite 5 and or additional additives 25 to provide the cement slurry 50. In embodiments, such as depicted in FIG. 2B, asphaltite 5 and graphene 10 can be combined with at least a portion of the water 20 to provide a mix or blend water, as indicated at 130, and, the mix or blend water comprising the asphaltite 5 and graphene 10 can be combined with the cementitious material (e.g., cement powder) 30 and any remaining water 20 to provide the cement slurry 50, as depicted at 140. Alternatively or additionally, asphaltite 5 and graphene 10 can be otherwise incorporated into cement slurry 50. For example, in embodiments, graphene 10 can be dry blended into cementitious material 30 and asphaltite 5 combined with a portion of the water 20 prior to combining with the cementitious material 30. As noted herein, the order of combination of the asphaltite 5, graphene 10, water 20, optional additional additive(s) 25, and cementitious material 30 can be adjusted, and such embodiments remain within the scope of this disclosure.

As described hereinabove, the graphene 10 can comprise traditional or synthetic graphene and/or bioderived renewable graphene (BRG), such as, without limitation, BRG comprising graphene derived from a plant, such as the cassava plant. The BRG can comprise graphene with a fused sheet-like morphology (e.g., graphene nanosheets), such as the graphene 10 comprising BRG described in U.S. Patent Publication No. 2021/0061661, U.S. Patent Publication No. 2021/0238040, and/or U.S. Patent Publication No. 2019/0144280, incorporated hereinabove by reference.

As discussed hereinabove, the cement slurry 50 can comprise from about 0.2 to about 20, from about 0.2 to about 15, from about 0.1 to about 10, or from about 0.1 to about 5 percent asphaltite 5 by weight of cement (% graphene bwoc). In embodiments, the cement slurry 50 can comprise from about 0.2 to about 20, from about 0.2 to about 15, from about 0.2 to about 10, or from about 0.1 to about 5 percent uintaite (e.g., GILSONITE™ uintaite) as asphaltite 5 by weight of cement (% graphene bwoc).

As discussed hereinabove, the cement slurry 50 can comprise from about 0.2 to about 20, from about 0.2 to about 15, from about 0.2 to about 10, from about 0.2 to about 5, from about 0.5 to about 5, or greater than or equal to about 0.2, 0.3, 0.4, 0.5, 1, 2, 3, 4, 5, 6, 7, 8, 9, 10, 11, 12, 13, 14, 15, 16, 17, 18, 19, or 20 and less than or equal to about 20, 19, 18, 17, 16, 15, 14, 13, 12, 11, 10, 9, 8, 7, 6, 5, 4, 3, 2, 1, 0.9, 0.8, 0.7, 0.6, 0.5, 0.4, 0.3, 0.25, 0.2, or 0.1 percent graphene 10 by weight of cementitious material 30 (% graphene bwoc). The graphene 10 can comprise BRG, SG, or a combination thereof, As noted above, in embodiments, the cementitious material 30 can comprise a Portland cement, for example selected from API Portland cements (e.g., API Class A-H, K-L) or ASTM Portland cements (e.g., ASTM 150 Type 1 or Type 2), or a combination thereof.

Also disclosed herein is a method of using the cement slurry 50 of this disclosure, for example, to provide a set cement 60 (FIG. 1) having enhanced mechanical properties relative to a same cement absent the asphaltite 5 and/or graphene 10. Such a method will now be described with reference to FIG. 3, which is a schematic flow diagram of a method 200, according to embodiments of this disclosure. Method 200 comprises: providing a cement slurry 50 of this disclosure at 210 (e.g., combining asphaltite 5, graphene 10, water 20, optional additional additive(s), cementitious material 30 to provide cement slurry 50), placing the cement slurry 50 in a workspace at 220, and allowing the cement slurry 50 to set to provide a hardened cement 60 (also referred to herein as a "set" cement) at 230. The cement slurry can be a cement slurry 50 as described hereinabove with reference to FIG. 1 and/or made as described hereinabove with reference to FIG. 2A and/or FIG. 2B.

The workspace can comprise an oilwell workspace, such as, for example and without limitation, a subterranean workspace, such as a wellbore. In embodiments, the workspace comprises a non-oilwell workspace, such as, for example and without limitation, a construction site, roadway repair, tunnel/mining, bridges, etc.

In embodiments, graphene 10 comprises standard SG, and/or non-BRG graphene. As detailed hereinabove, the graphene 10 can comprise BRG. In embodiments, graphene 10 comprises graphene 10 derived from a plant, such as, without limitation, the cassava plant. The BRG can comprise graphene nanosheets, in embodiments.

By way of non-limiting example, the exemplary cement slurries 50 disclosed herein may be employed in an oilwell workspace. For example, a cement slurry 50 can be deployed at the workspace via any methods known in the art and with the help of this disclosure. For example, cement slurry 50 can be introduced downhole via a cementing apparatus.

Figure 4:
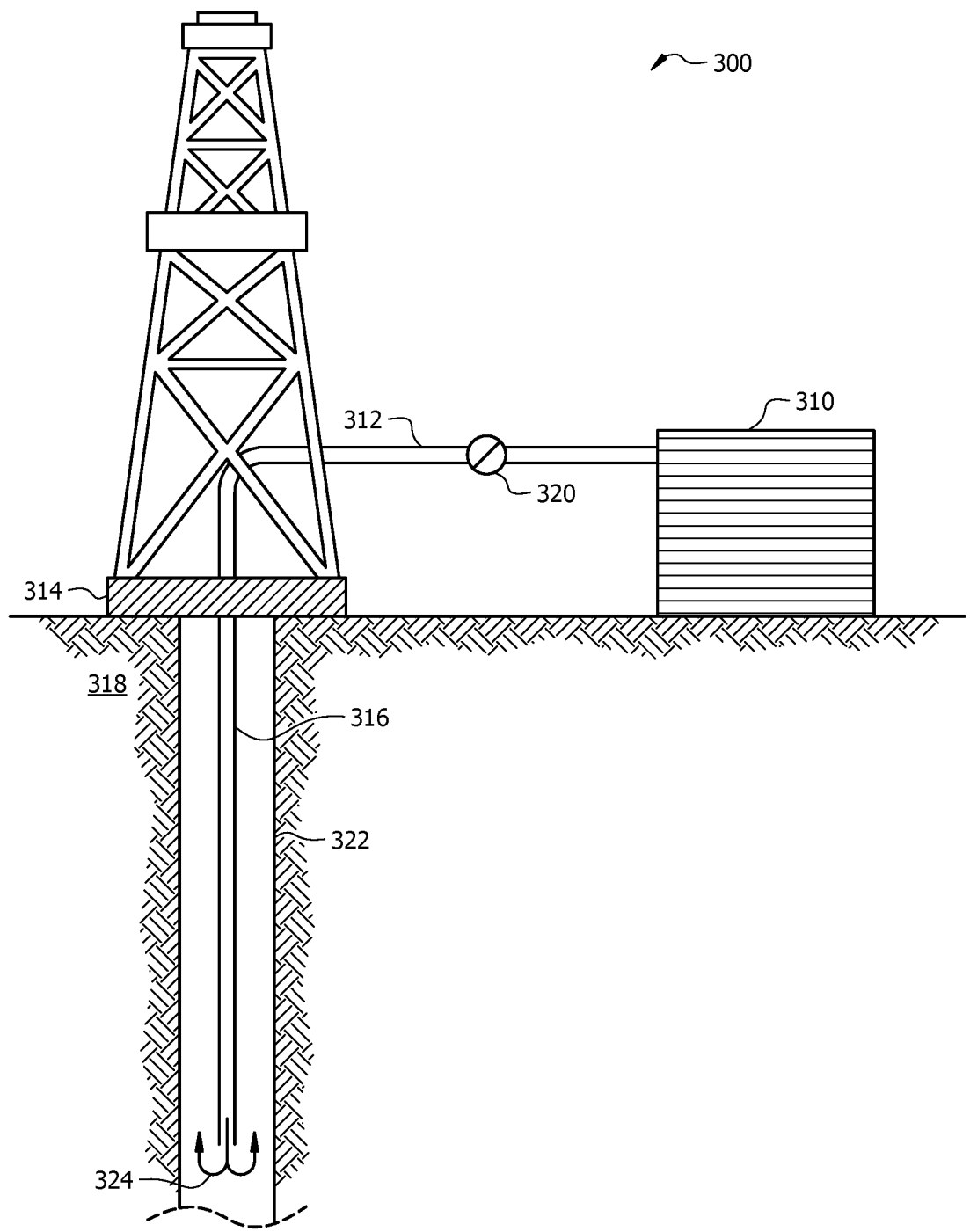
FIG. 4 is a schematic of a cementing workspace, according to embodiments of this disclosure.
Figure 5:
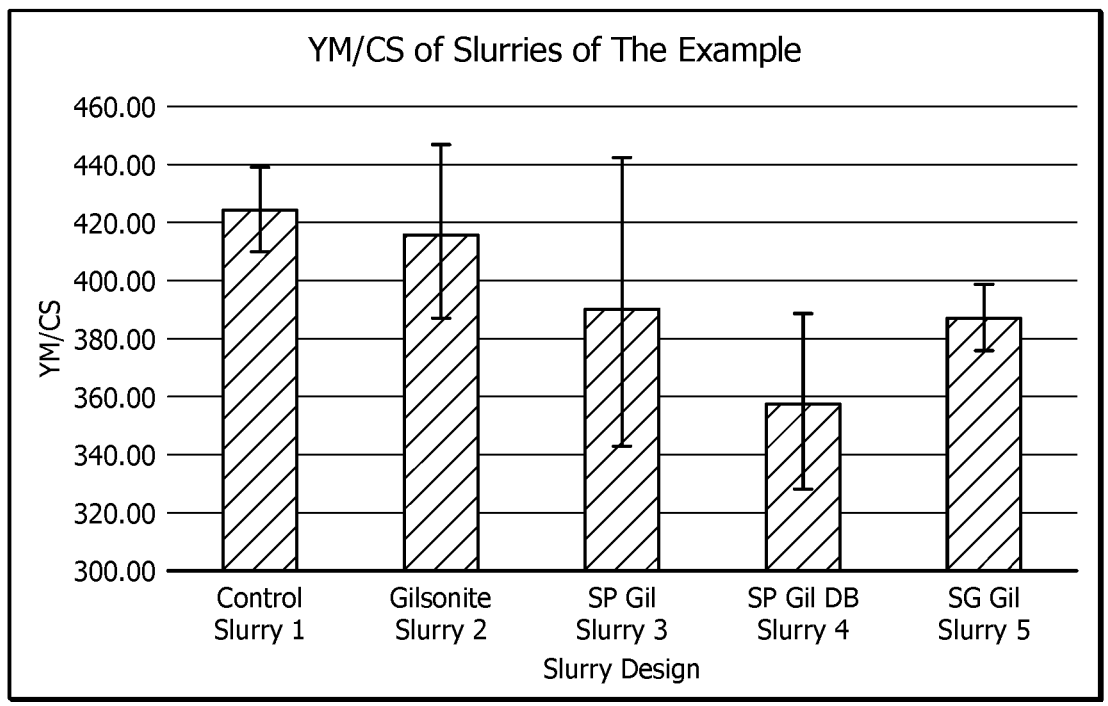
FIG. 5 is a bar graph of the YM/CS ratio of set cement samples of the Example.

FIG. 4 shows an illustrative schematic of cementing workspace or system 300 that can deliver cement slurry 50 of the present disclosure to a downhole location, according to one or more embodiments. It should be noted that while FIG. 4 generally depicts a land-based system, it is to be recognized that like systems may be operated in subsea locations as well. As depicted in FIG. 4, system 300 may include mixing tank 310, in which a cement slurry 50 of the present disclosure may be formulated. Again, in some embodiments, the mixing tank 310 may represent or otherwise be replaced with a transport vehicle or shipping container configured to deliver or otherwise convey the final cement slurry to the well site. The cement slurry 50 may be conveyed via line 312 to wellhead 314, where the cement slurry 50 enters tubular 316 (e.g., a casing, drill pipe, production tubing, coiled tubing, etc.), tubular 316 extending from wellhead 314 into wellbore 322 penetrating subterranean formation 318. Upon being ejected from tubular 316, the cement slurry 50 may subsequently return up the wellbore in the annulus between the tubular 316 and the wellbore 322 as indicated by flow lines 324. In other embodiments, the cement slurry 50 may be reverse pumped down through the annulus and up tubular 316 back to the surface, without departing from the scope of the disclosure. Pump 320 may be configured to raise the pressure of the cement slurry to a desired degree before its introduction into tubular 316 (or annulus). It is to be recognized that system 300 is merely exemplary in nature and various additional components may be present that have not necessarily been depicted in FIG. 4 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. Moreover, reverse cementing, where the final cement slurry is directly placed in the annulus between the tubular 316 and the wellbore 322 may also be performed in accordance with the embodiments described herein, without departing from the present disclosure.

One skilled in the art, with the benefit of this disclosure, should recognize the changes to the system described in FIG. 4 to provide for other cementing operations squeeze operations, reverse cementing (where the cement is introduced into an annulus between a tubular and the wellbore and returns to the wellhead through the tubular), and the like.

It is also to be recognized that the disclosed cement slurries 50 may also directly or indirectly affect the various downhole equipment and tools that may come into contact with the final cement slurry during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 4.

Upon setting, the hardened cement (60 in FIG. 1) produced by allowing the cement slurry 50 to set (e.g., for a setting time) can have a compressive strength, a tensile strength, a Young's modulus, a Poisson's ratio, or a combination thereof that is comparable or enhanced relative to compressive strength (CS), tensile strength, Young's modulus (YM), Poisson's ratio, or a combination thereof of a hardened cement 60 produced from a same cement slurry absent the asphaltite 5, the graphene 10, or both. In embodiments, a ratio of the YM to the CS (i.e., the YM/CS ratio) of the hardened cement 60 is reduced relative to the YM/CS ratio of a hardened cement produced from a same cement slurry comprising the same components, but absent the asphaltite 5 and/or graphene 10. In embodiments, the hardened cement 60 has an increased resilience relative to the hardened cement produced from the same cement slurry comprising the same components, but absent the asphaltite 5 and/or graphene 10. Such reduction in YM/CS ratio can indicate increased resilience of the set cement 60.

In embodiments, the hardened cement 60 has a CS that is at least 5, 10, 20, 30, 40, 45, or 50, % or more, or from about 5 to about 50, from about 10 to about 50, or from about 20 to about 50% greater than the CS of the hardened cement produced from the same cement slurry otherwise comprising the same components, but absent the asphaltite 5 and/or graphene 10.

In embodiments, the hardened cement 60 has a YM that is at least 5, 10, 15, 20, 25, 30, 40, 45, or 50, % (or more), or from about 5 to about 50, from about 10 to about 40, or from about 20 to about 25% greater than the YM of the hardened cement produced from the same cement slurry comprising the same components, but absent the asphaltite 5 and/or graphene 10.

In embodiments, the hardened cement 60 has a YM/CS ratio that is at least 1, 2, 3, 4, 5, 6, 7, 8, 9, 10, 11, 12, 13, 14, 15% (or more), or from about 1 to about 40, from about 5 to about 40, or from about 10 to about 15% less than the YM/CS ratio of the hardened cement produced from the same cement slurry comprising the same components, but absent the asphaltite 5 and/or graphene 10.

In embodiments, a resilience of the hardened cement 60 (as indicated by a reduction in YM/CS ratio) is at least 10, 20, 30, 40, or 50% greater than the resilience of the hardened cement produced from the same cement slurry otherwise comprising the same components, but absent the asphaltite 5 and/or graphene 10.

In embodiments, the graphene 10 comprising BRG can be utilized and/or serves as a suspension aid in a cement slurry 50 of this disclosure, for example, as described in U.S. patent application Ser. No. 17/892,775, filed Aug. 22, 2022, now U.S. Pat. No. 11,981,858 B2, and entitled, "Graphene Fluid Utilized to Suspend Particulates", the disclosure of which is hereby incorporated herein in its entirety for purposes not contrary to this disclosure; the graphene 10 can be utilized and/or serves as a cement retarder in a cement slurry 50 of this disclosure, for example, as described in U.S. patent application Ser. No. 17/892,781, filed Aug. 22, 2022, now U.S. Patent Application Publication No. 2024/0059953 A1, and entitled, "Graphene as a Cement Retarder", the disclosure of which is hereby incorporated herein in its entirety for purposes not contrary to this disclosure; the graphene 10 can be utilized and/or serves to mitigate transient gels in a composition 50 of this disclosure, for example, as described in U.S. patent application Ser. No. 17,892,787, filed Aug. 22, 2022, now U.S. Pat. No. 12,018, 207 B2, and entitled, "Mitigation of Transient Gels in Cements", the disclosure of which is hereby incorporated herein in its entirety for purposes not contrary to this disclosure; and/or the graphene 10 can be utilized and/or serves to enhance stability and density control in a cement slurry 50 of this disclosure, for example, as described in U.S. patent application Ser. No. 17/892,790, filed Aug. 22, 2022, now U.S. Pat. No. 12,065,377 B2, and entitled, "Use of Graphene To Enhance Stability and Density Control of Cement Slurries", the disclosure of which is hereby incorporated herein in its entirety for purposes not contrary to this disclosure.

As described herein, asphaltite 5 and graphene 10 can be utilized to produce hardened cements 60 having enhanced mechanical properties relative to hardened cements produced in the absence of the asphaltite 5 and/or graphene 10.

Without being limited by theory, the aromatic compounds in asphaltite (e.g., GILSONITE™) can help hold onto the graphene through pi stacking (pi-pi interaction). This can help increase the load transfer within the cement matrix, while the presence of the asphaltite (e.g., GILSONITE™) lowers the Young's modulus. Together, these effects can lead to enhanced mechanical properties of the resulting cement sheath and improve resilience beyond individual contributions (e.g., what is expected from a combination of asphaltite (e.g., GILSONITE™) alone in combination with graphene alone).

Utilizing a more resilient cement, such as the herein disclosed cement, can provide improved barrier reliability, stress cyclability, and/or potentially reduce the number of additional additives, thus resulting in a lower cost of goods sold (COGS). Utilizing a more resilient material can also reduce the need for remediation operations during the life of the well in which the cement is utilized.

By combining both asphaltite (e.g., GILSONITE™) and graphene in a cement matrix, as per this disclosure, improved mechanical properties beyond the individual contributions can be realized. Without being limited by theory, the asphaltite (e.g., GILSONITE™) can contain aromatic and/or asphaltenic materials which can interact with graphene in a beneficial manner to provide the enhanced cement properties. For example, the asphaltite (e.g., GILSONITE™) can help maintain separation among the graphene particles in the cement slurry, providing a better "handle" on the asphaltite (e.g., GILSONITE™) particles allowing them to better transfer loads within the set cement matrix, thus reducing crack formation and propagation.

Other advantages will be apparent to those of skill in the art and with the help of this disclosure.

Many modifications or expansions upon the invention and the various illustrative embodiments described in this application still fall within the spirit and scope of the invention, and should be so considered.

EXAMPLE

The embodiments having been generally described, the following example is given as a particular example to demonstrate the practice and advantages of this disclosure. It is understood that The Example is given by way of illustration and is not intended to limit the specification or the claims in any manner.

To examine the synergistic effects between GILSONITE™ and graphene, five slurries were formulated and prepared using GILSONITE™, BRG from Surge Power (SP), and/or standard graphene (SG). Slurry 1 was a control comprising no GILSONITE™ and no graphene; Slurry 2 was a comparative slurry comprising GILSONITE™ and no graphene; Slurry 3 and Slurry 4 were inventive slurries comprising GILSONITE™ and BRG graphene (SP, from Surge Power); Slurry 5 was an inventive slurry comprising GILSONITE™ and Standard Graphene (SG). For Slurry 4, (e.g., comprising GILSONITE™+SP DB), the GILSONITE™ and SP graphene powders were shaken together by hand for 2 minutes before adding to the dry cement powder 30 and further mixed by hand. This sample is indicated by the use of "DB", short for "dry blended". The dry cement mixture of this Slurry 4 comprising the GILSONITE™ and graphene was then hydrated in a blender with water. With all other slurries (e.g., Slurries 1-3 and 5), the GILSONITE™ and graphene (when present) were added to (e.g., combined with) the blend water 20 before the cement powder 30 was added.

The cement slurries were mixed and blended following API procedures (API RP 10B-2) and poured into 1×3 inch brass molds. The molds were placed in water baths and cured at 180° F. for 48 hours. After initial curing, the set cement samples were removed from the brass molds and placed in 2-cube autoclaves which were filled with water. The cement samples were then cured in the autoclave at 180° F. and 3000 psi for seven days. After autoclave curing, the hardened cement samples were collected and submitted for mechanical property testing and the results were tabulated (Table 2 below). All mechanical property measurements were performed on two separate samples and Table 2 includes the average for each property. YM was determined according to ASTM C469/C469M, and CS was determined according to ASTM C39/C39M.

Two samples of each cement slurry 50 were cured in a 180° F. water bath for seven days. After setting, the compressive strength (CS) and Young's Modulus (YM) were measured for each sample. Additionally, the ratio of YM/CS (e.g., the resilience) was calculated, as well as the percent change of the YM/CS as compared to the neat cement slurry of Slurry 1. Table 2 lists the data obtained for CS, YM, the calculated YM/CS, and the calculated percentage change in the YM/CS ratio relative to the average of the control Slurries 1. The values of the Young's Modulus from Table 2 are divided by Compressive Strength of Table 2 for each sample to provide the YM/CS ratio.

TABLE 2

Mechanical Properties of Slurries of The Example

| Sample | Compressive Strength (psi) | Young's Modulus (Mpsi) | YM/CS | % Change of YM/CS |
|---|---|---|---|---|
| Slurry 1 | 1044.25 | 0.428 | 409.79 | |
| Slurry 1 | 959.27 | 0.421 | 439.07 | |
| Avg Slurry 1 | 1001.76 | 0.425 | 423.81 | — |
| Slurry 2 | 1366.14 | 0.529 | 387.45 | |
| Slurry 2 | 1239.84 | 0.554 | 446.51 | |
| Avg Slurry 2 | 1302.99 | 0.541 | 415.55 | −1.95% |
| Slurry 3 | 1510.80 | 0.668 | 442.41 | |
| Slurry 3 | 1660.01 | 0.569 | 343.01 | |
| Avg Slurry 3 | 1585.40 | 0.619 | 390.37 | −7.89% |
| Slurry 4 | 1583.16 | 0.615 | 388.71 | |
| Slurry 4 | 1714.54 | 0.563 | 328.52 | |
| Avg Slurry 4 | 1648.85 | 0.589 | 357.41 | −15.97% |
| Slurry 5 | 1471.18 | 0.553 | 375.89 | |
| Slurry 5 | 1464.73 | 0.583 | 398.25 | |
| Avg Slurry 5 | 1467.95 | 0.568 | 387.04 | −8.68% |

TABLE 1

Slurries of The Example

| Slurry | Components and Design | Lafarge Class H (g) | SA-1015 (g) | Fresh Water (g) | GILSONITE ™ (g) | Graphene (SP) (g) | Graphene (ST) (g) |
|---|---|---|---|---|---|---|---|
| 1 | Control | 267.83 | 0.2 | 195.67 | | | |
| 2 | GILSONITE ™ | 265.23 | 0.2 | 171.75 | 26.52 | | |
| 3 | GILSONITE ™ + SP[1] | 264.14 | 0.2 | 171.63 | 26.41 | 1.32 | |
| 4 | GILSONITE ™ + SP[1] DB[2] | 264.14 | 0.2 | 171.63 | 26.41 | 1.32 | |
| 5 | GILSONITE ™ + SG[3] | 264.14 | 0.2 | 171.63 | 26.41 | | 1.32 |

[1]SP = Surge Power BRG
[2]DB = Dry Blended
[3]SG = Standard Graphene

Although an increase in YM is not generally desired with hardened cement 60, the relative increase in compressive strength must also be considered to get a better understanding of the overall changes in mechanical properties. The ratio of YM/CS is a unitless number, the interpretation of which isn't highly intuitive. A smaller YM/CS ratio indicates improved resiliency, a desired quality. This may be opposite as to what is typically intuitive. Looking at each component individually, a higher compressive strength (CS) is desirable. Young's Modulus, on the other hand, indicates an ability of a material to deform rather than fracture. In this case, a lower number for YM (and lowered YM/CS ratio) can be more desirable (e.g., it can be desirable to have a higher increase in CS than any increase in YM).

Since both YM and CS often change in different amounts in relation to each other, using the ratio YM/CS can be a more straight forward way of showing the total change in resilience of a material. Decreasing YM and keeping CS the same will result in a smaller, thus more desirable, YM/CS ratio. Likewise, increasing CS and keeping YM the same will also result in a smaller, more desirable YM/CS ratio. If YM and CS change, then the ratio of the two will indicate an overall change in the resilience of the material, with a reduced YM/CS ratio indicating increased resilience.

Considering the percent change of the YM/CS ratio shown in Table 2, which is the percentage change of the YM/CS ratio of the sample material in relation to the control slurry 1, it can be seen that adding GILSONITE™ to the control slurry 1 decreased the YM/CS ratio of the Slurry 2 by 1.95%. Accordingly, in embodiments, asphaltite 5 can be utilized without graphene 10. However, adding 0.05% of SP graphene (e.g., the BRG) decreased the YM/CS ratio of the Slurry 3 by 7.89% relative to the control Slurry 1. The YM/CS ratio was decreased by 15.97% relative to the control Slurry 1 by initially dry blending the GILSONITE™ and graphene (e.g., the SP BRG), adding this dry mixture to cement powder 30, then hydrating the entire mixture to provide Slurry 4. Adding 0.05% of SG graphene also decreased the YM/CS ratio of the Slurry 5 by 8.68% relative to the control Slurry 1, supporting the use of BRG and/or non-BRG in graphene 10. The results of this Example show that there is an unexpected synergistic relationship between the GILSONITE™ and the graphene that significantly improves the resilience relative to that of the neat cement of control Surry 1 and the graphene-free comparative Slurry 2.

Figure 3:
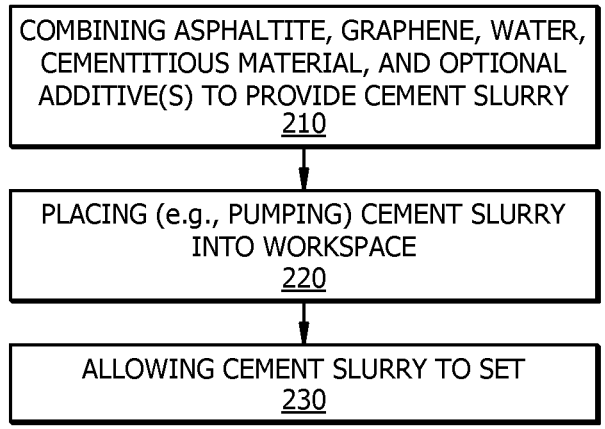
FIG. 3 is a schematic flow diagram of a method of making a hardened cement, according to embodiments of this disclosure.

FIG. 3 is a bar graph of the YM/CS ratios obtained for the set cement 60 samples obtained from the Slurries of this Example, showing the improved (smaller) YM/CS ratio obtained using both GILSONITE™ and graphene additives in the cement slurry. The YM/CS ratio provides a good indication of overall changes in mechanical properties, with lower values of the YM/CS ratio representing more resilient hardened cements 60, e.g., lower YM and higher CS or a greater increase in CS than YM.

Additional Disclosure

The following are non-limiting, specific embodiments in accordance with the present disclosure:

In a first embodiment, a method comprises: providing a cement slurry comprising: an asphaltite; graphene; a cement; and water; placing the cement slurry in a workspace; and allowing the cement slurry to set to provide a hardened cement, wherein a compressive strength (CS), and/or a reduction in a ratio of Young's modulus to CS (YM/CS) of the hardened cement is greater than the CS, and/or reduction in the ratio of YM/CS of a same cement absent the asphaltite and/or the graphene.

A second embodiment can include the method of the first embodiment, wherein the workspace comprise a wellbore penetrating a subterranean formation.

A third embodiment can include the method of the second embodiment, wherein the workspace comprises an annulus between a tubular and a wall of the wellbore.

A fourth embodiment can include the method of any one of the first to third embodiments, wherein the cement slurry comprises from about 0.2 to about 20, from about 0.2 to about 15, from about 0.1 to about 10, or from about 0.1 to about 5 percent graphene 10 by weight of cement (% graphene bwoc), from about 0.2 to about 20, from about 0.2 to about 15, from about 0.1 to about 10, or from about 0.1 to about 5 percent asphaltite 5 by weight of cement (% graphene bwoc), or a combination thereof.

A fifth embodiment can include the method of any one of the first to fourth embodiments, wherein the asphaltite comprises uintaite (e.g., GILSONITE™ uintaite).

A sixth embodiment can include the method of any one of the first to fifth embodiments, wherein the graphene comprises bioderived renewable graphene (BRG), non-BRG graphene, or a combination thereof.

A seventh embodiment can include the method of the sixth embodiment, wherein the cement slurry comprises from about 0.2 to about 20% BRG bwoc.

An eighth embodiment can include the method of the sixth or seventh embodiment, wherein the BRG comprises graphene derived from a plant.

A ninth embodiment can include the method of any one of the sixth to eighth embodiments, wherein the BRG comprises graphene with a fused sheet-like morphology.

A tenth embodiment can include the method of any one of the sixth to ninth embodiments, further comprising forming the BRG by: providing a renewable carbohydrate source to a reactor comprising a solvent to obtain a soaked or dissolved carbohydrate source; adding a dehydration solution and a catalyst to the reactor comprising the soaked or dissolved carbohydrate source to obtain a reaction mixture, where the dehydration solution has a hydrogen ions concentration of at least approximately 1%; charging said reactor with air or inert gas; heating the reaction mixture to remove glycosidic linkages and water molecules from the carbohydrate thereby producing an intermediate mixture with sheet-like morphology; and further heating the intermediate mixture in inert gas to form a carbon nanosheet material comprising BRG.

An eleventh embodiment can include the method of the tenth embodiment, wherein said carbohydrate source comprises yam root extract, potatoes root extract, cassava root extract, cassava root flour, tapioca flour, dried cassava root pulp, dried and fried cassava root flakes, sugarcane extract, sugar beet root extract, sucrose, rice grain, corn, wheat grain, or a combination thereof.

A twelfth embodiment can include the method of the tenth or eleventh embodiment, wherein the solvent is chosen from the group consisting of distilled water, deionized water, ethanol, ethylene glycol, or a combination thereof.

A thirteenth embodiment can include the method of any one of the tenth to twelfth embodiments, wherein the dehydration solution is chosen from the group consisting of sodium hydroxide, hydrochloric acid, phosphoric acid, phosphorous acid, nitric acid, or a combination thereof.

A fourteenth embodiment can include the method of any one of the tenth to thirteenth embodiments, further comprising removing the dehydration solution by washing and diluting with excess distilled or deionized water prior to further heating of the intermediate mixture.

A fifteenth embodiment can include the method of any one of the tenth to fourteenth embodiments, wherein the catalyst is chosen from the group consisting of platinum, palladium, LiAlH$_4$, nickel, yeast, aluminum-nickel alloy, cobalt, B$_2$H$_6$, zinc, NaBH$_4$, copper, or combinations thereof.

A sixteenth embodiment can include the method of any one of the tenth to fifteenth embodiments, further comprising removing said catalyst by washing, filtering, magnetic separation, sonication, sieving, centrifugation, or a combination thereof prior to further heating of the intermediate mixture.

A seventeenth embodiment can include the method of any one of the tenth to sixteenth embodiments, wherein the heating of the reaction mixture is carried out in air or inert gas at approximately 45 to 1050° C.

An eighteenth embodiment can include the method of any one of the tenth to seventeenth embodiments, further comprising, prior to further heating the intermediate mixture, drying the intermediate mixture to produce an intermediate mixture in form of a powder; wherein the intermediate mixture in form of powder is heated in the inert gas at approximately 500 to 1500° C. to produce the carbon nanosheet material.

A nineteenth embodiment can include the method of any one of the tenth to eighteenth embodiments, wherein said inert gas comprises argon, helium, or nitrogen, and optionally further comprises a partial pressure of hydrogen gas.

A twentieth embodiment can include the method of any one of the tenth to nineteenth embodiments, wherein the intermediate mixture is heated to a temperature of approximately 45 to 1050° C.

A twenty first embodiment can include the method of any one of the first to twentieth embodiments, the cement comprises a cement selected from the group consisting of API cements, Type I, IA, II, IIA, III, IIIA, IV, V, VI, VII Portland cements, non-API cements, or combinations thereof.

A twenty second embodiment can include the method of any one of the first to twenty first embodiments, wherein a Young's modulus of the hardened cement is less than the Young's modulus of the same cement or wherein the Young's modulus of the hardened cement is greater than the Young's modulus of the same cement, while the YM/CS ratio is less than the YM/CS ratio of the same cement.

A twenty third embodiment can include the method of any one of the first to twenty second embodiments, wherein the hardened cement has increased resiliency relative to the same cement, wherein the resiliency is determined as the reduction in the ratio of the Young's modulus to the compressive strength.

A twenty fourth embodiment can include the method of the twenty third embodiment, wherein the ratio of the Young's modulus to the compressive strength of the hardened cement is reduced by at least 10, 20, 30, 40, or 50% relative to the ratio of the Young's modulus to the compressive strength of the same cement.

In a twenty fifth embodiment, a hardened cement produced by allowing a cement slurry to set, wherein the cement slurry comprises: an asphaltite; graphene; a cement; and water, wherein a resiliency of the hardened cement is increased relative to the resiliency of a hardened cement produced from a same cement slurry absent the asphaltite and/or the graphene, wherein the increased resiliency is determined as a reduction in the ratio of the Young's modulus to the compressive strength.

A twenty sixth embodiment can include the hardened cement of the twenty fifth embodiment, wherein the hardened cement has a decreased Young's modulus, an increased compressive strength, or both a decreased Young's modulus and an increased compressive strength relative to the same cement.

A twenty seventh embodiment can include the hardened cement of the twenty sixth embodiment, wherein the ratio of the Young's modulus to the compressive strength of the hardened cement is reduced by at least 10, 20, 30, 40, or 50% relative to the ratio of the Young's modulus to the compressive strength of the same cement.

A twenty eighth embodiment can include the hardened cement of any one of the twenty fifth to twenty seventh embodiments, wherein the cement slurry comprises from about 0.2 to about 20, from about 0.2 to about 15, from about 0.1 to about 10, or from about 0.1 to about 5 percent graphene 10 by weight of cement (% graphene bwoc), from about 0.2 to about 20, from about 0.2 to about 15, from about 0.1 to about 10, or from about 0.1 to about 5 percent asphaltite 5 by weight of cement (% graphene bwoc), or a combination thereof.

A twenty ninth embodiment can include the hardened cement of any one of the twenty fifth to twenty eighth embodiments, wherein the asphaltite comprises uintaite (e.g., GILSONITE™ uintaite).

A thirtieth embodiment can include the hardened cement of any one of the twenty fifth to twenty ninth embodiments, wherein the graphene comprises bioderived renewable graphene (BRG), synthetic graphene, or a combination thereof.

A thirty first embodiment can include the hardened cement of the thirtieth embodiment, wherein the cement slurry comprises from about 0.2 to about 20% BRG bwoc.

In a thirty second embodiment, a subterranean structure comprises: a tubular disposed in a wellbore and a hardened cement disposed in an annulus between a wall of the wellbore and the tubular, wherein the hardened cement is bonded to the tubular and the wall of the wellbore to seal a portion of the annulus from fluid flow; wherein the hardened cement is a product of the setting of a cement slurry comprising: an asphaltite, graphene; a cement; and water, wherein a compressive strength (CS), and/or a reduction in a ratio of YM/CS of the hardened cement is greater than the CS, and/or the reduction in the YM/CS ratio of a hardened cement produced from a same cement slurry absent the asphaltite and/or the graphene.

A thirty third embodiment can include the subterranean structure of the thirty second embodiment, wherein the hardened cement has a greater compressive strength than the compressive strength of the hardened cement produced from the same cement slurry.

A thirty fourth embodiment can include the subterranean structure of the thirty second or thirty third embodiment, wherein the cement slurry comprises from about 0.2 to about 20, from about 0.2 to about 15, from about 0.1 to about 10, or from about 0.1 to about 5 percent graphene 10 by weight of cement (% graphene bwoc), from about 0.2 to about 20, from about 0.2 to about 15, from about 0.1 to about 10, or from about 0.1 to about 5 percent asphaltite 5 by weight of cement (% graphene bwoc), or a combination thereof.

A thirty fifth embodiment can include the subterranean structure of any one of the thirty second to thirty fourth embodiments, wherein the asphaltite comprises uintaite (e.g., GILSONITE™ uintaite).

A thirty sixth embodiment can include the subterranean structure of any one of the thirty second to thirty fifth embodiments, wherein the graphene comprises bioderived renewable graphene (BRG), non-BRG, or a combination thereof.

A thirty seventh embodiment can include the subterranean structure of the thirty sixth embodiment, wherein the cement slurry comprises from about 0.2 to about 20%, from about 0.2 to about 15, or from about 0.5 to about 10 percent BRG bwoc.

A thirty eighth embodiment can include the subterranean structure of the thirty sixth or thirty seventh embodiment, wherein the BRG comprises graphene derived from a plant.

A thirty ninth embodiment can include the subterranean structure of any one of the thirty sixth to thirty eighth embodiments, wherein the BRG comprises graphene with a fused sheet-like morphology.

A fortieth embodiment can include the subterranean structure of any one of the thirty second to thirty ninth embodiments, wherein the cement comprises a cement selected from the group consisting of API cements, Type I, IA, II, IIA, III, IIIA, IV, V, VI, VII Portland cements, non-API cements, or a combination thereof.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method comprising:
provinding a cement slurry by incorporating an asphaltite and graphene into a mixture comprising: a cement and water, whereby the cement slurry comprises from 0.2 to 20 percent graphene by weight of cement (% graphene bwoc) and from 0.2 to 20 percent asphaltite by weight of cement (% graphene bwoc);
placing the cement slurry in a workspace; wherein the workspace comprises a wellbore penetrating a subterranean formation;
allowing the cement slurry to set to provide a hardened cement; and
thereby increasing a resiliency of the hardened cement by a synergistic interaction of the asphaltite and the graphene relative to a resiliency of a comparative hardened cement produced from an otherwise same cement slurry absent the asphaltite, the graphene or both, wherein the increased resiliency is determined as a reduction in a ratio of Young's modulus (YM) to compressive strength (CS) of the hardened cement relative to a ratio of YM to CS of the comparative hardened cement.

2. The method of claim 1, wherein the workspace comprises an annulus between a tubular and a wall of the wellbore.

3. The method of claim 1, wherein the asphaltite comprises uintaite.

4. The method of claim 1, wherein the graphene comprises bioderived renewable graphene (BRG), non-BRG graphene, or a combination thereof.

5. The method of claim 1, wherein:
the Young's modulus of the hardened cement is less than or greater than the Young's modulus of the comparative hardened cement.

6. The method of claim 1, wherein the ratio of the Young's modulus to the compressive strength of the hardened cement is reduced by 10%-50% relative to the ratio of the Young's modulus to the compressive strength of the comparative hardened cement.

7. The method of claim 1, wherein the ratio of the Young's modulus to the compressive strength of the hardened cement is reduced by 20%-50% relative to the ratio of the Young's modulus to the compressive strength of the comparative hardened cement.

* * * * *